US012656803B2

(12) United States Patent
Al-Shyoukh et al.

(10) Patent No.: US 12,656,803 B2
(45) Date of Patent: Jun. 16, 2026

(54) FLIPPED GATE VOLTAGE REFERENCE CIRCUIT AND METHOD

(71) Applicant: TAIWAN SEMICONDUCTOR MANUFACTURING COMPANY, LTD., Hsinchu (TW)

(72) Inventors: Mohammad Al-Shyoukh, Hsinchu (TW); Alex Kalnitsky, Hsinchu (TW)

(73) Assignee: TAIWAN SEMICONDUCTOR MANUFACTURING COMPANY, LTD., Hsinchu (TW)

(*) Notice: Subject to any disclaimer, the term of this patent is extended or adjusted under 35 U.S.C. 154(b) by 0 days.

(21) Appl. No.: 18/756,323

(22) Filed: Jun. 27, 2024

(65) Prior Publication Data

US 2024/0345612 A1 Oct. 17, 2024

Related U.S. Application Data

(63) Continuation of application No. 17/370,733, filed on Jul. 8, 2021, now Pat. No. 12,038,773, which is a (Continued)

(51) Int. Cl.
*G05F 3/26* (2006.01)
*G05F 3/20* (2006.01)

(52) U.S. Cl.
CPC .................. *G05F 3/20* (2013.01); *G05F 3/26* (2013.01); *G05F 3/262* (2013.01)

(58) Field of Classification Search
CPC ... G05F 3/20; G05F 3/26; G05F 3/262; G05F 3/02; G05F 3/16; G05F 3/222; G05F 3/225; G05F 3/227; G05F 3/24
See application file for complete search history.

(56) References Cited

U.S. PATENT DOCUMENTS

| | | | |
|---|---|---|---|
| 6,014,053 | A | 1/2000 | Womack |
| 6,831,505 | B2 | 12/2004 | Ozoe |

(Continued)

FOREIGN PATENT DOCUMENTS

| | | |
|---|---|---|
| CN | 1013611268 | 2/2009 |
| CN | 103092239 | 5/2013 |

(Continued)

OTHER PUBLICATIONS

Oguey, Henri J., et al., "MOS Voltage Reference Based on Polysilicon Gate Work Function Difference", 1980 IEEE, pp. 264-269.

(Continued)

*Primary Examiner* — Nguyen Tran
(74) *Attorney, Agent, or Firm* — Hauptman Ham, LLP

(57) ABSTRACT

A voltage reference includes a PMOS transistor including a gate and drain coupled to an input and a source coupled to a voltage node through a resistor, three PMOS transistors including gates coupled to the input and sources coupled to the voltage node through resistors, an n-type flipped-gate transistor including a gate and drain coupled to a PMOS transistor drain and a source coupled to a negative supply node, an NMOS transistor including a gate coupled to the n-type flipped-gate transistor gate, a drain coupled to a PMOS transistor drain, and a source coupled to an output, an NMOS transistor including a gate coupled to a PMOS transistor drain, a drain coupled to the output, and a source coupled to the negative supply node through a resistor, and an NMOS transistor including a drain coupled to the output and a gate and source coupled to the negative supply node.

20 Claims, 5 Drawing Sheets

Related U.S. Application Data continuation of application No. 16/177,001, filed on Oct. 31, 2018, now Pat. No. 11,068,007, which is a continuation of application No. 14/451,920, filed on Aug. 5, 2014, now Pat. No. 10,241,535, which is a continuation-in-part of application No. 14/182,810, filed on Feb. 18, 2014, now Pat. No. 11,269,368.

(56) References Cited

U.S. PATENT DOCUMENTS

| | | | | |
|---|---|---|---|---|
| 10,345,846 | B1 | 7/2019 | Bartling et al. | |
| 10,585,447 | B1 | 3/2020 | Tanimoto | |
| 2003/0098740 | A1* | 5/2003 | Hsieh | G05F 3/247 327/543 |
| 2003/0227322 | A1 | 12/2003 | Ozoe | |
| 2005/0218968 | A1 | 10/2005 | Watanabe | |
| 2006/0290416 | A1 | 12/2006 | Florescu | |
| 2007/0176260 | A1* | 8/2007 | Parekh | H01C 7/006 257/E27.047 |
| 2008/0087956 | A1* | 4/2008 | Blanchard | H10D 30/0289 257/E29.256 |
| 2008/0233694 | A1* | 9/2008 | Li | H10D 84/038 257/E21.639 |
| 2011/0193545 | A1* | 8/2011 | Ha | H03F 1/0211 323/315 |
| 2013/0063103 | A1 | 3/2013 | Samid | |
| 2013/0106394 | A1 | 5/2013 | Kobayashi | |

FOREIGN PATENT DOCUMENTS

| | | |
|---|---|---|
| JP | 2004-13584 | 1/2004 |
| JP | 2008217203 | 9/2008 |
| JP | 2012-73168 | 4/2012 |
| JP | 2012-88978 | 5/2012 |
| JP | 2013-97551 | 5/2013 |
| KR | 1020130047658 | 5/2013 |
| TW | 200803131 | 1/2008 |
| TW | 201331738 | 8/2013 |

OTHER PUBLICATIONS

Office Action dated Jun. 23, 2015 from corresponding No. JP 2014-119682, all pages.

Office Action dated Sep. 11, 2017 from corresponding No. DE 10 2014 103 597.6.

Notice of Allowance dated May 27, 2016 and English translation from corresponding No. KR 10-2014-165519, all pages.

Office Action dated Dec. 22, 2015 and English translation from corresponding No. KR 10-2014-0165519, all pages.

Office Action dated Nov. 2, 2015 from corresponding No. TW 103129145, all pages.

Oguey, Henri J., et al., "MOS Voltage Based on Polysilicon Gate Work Function Difference", 1980 IEEE, pp. 264-269.

* cited by examiner

FLIPPED GATE VOLTAGE REFERENCE CIRCUIT AND METHOD

PRIORITY CLAIM

This application is a continuation of U.S. application Ser. No. 17/370,733, filed Jul. 8, 2021, now U.S. Pat. No. 12,038,773, issued Jul. 16, 2024, which is a continuation of U.S. application Ser. No. 16/177,001, filed Oct. 31, 2018, now U.S. Pat. No. 11,068,007, issued Jul. 20, 2021, which is a continuation of U.S. application Ser. No. 14/451,920, filed Aug. 5, 2014, now U.S. Pat. No. 10,241,535, issued Mar. 26, 2019, which claims priority as a continuation-in-part to U.S. application Ser. No. 14/182,810, filed Feb. 18, 2014, now U.S. Pat. No. 11,269,368, issued Mar. 8, 2022, each of which is herein incorporated by reference in its entirety.

BACKGROUND

A voltage reference is a circuit used to provide a reference voltage signal to a circuit. The circuit uses the reference voltage signal as a means of comparison during operation. For example, in voltage regulator applications a feedback signal is compared against the reference voltage in order to create a regulated output voltage corresponding to a scaled value of the voltage reference.

In some approaches, the voltage reference is formed using bipolar junction transistors (BJTs) to form bandgap references to provide the reference voltage signal. In PNP BJTs, the substrate acts as a collector for the BJT thereby rendering the BJT sensitive to majority carrier noise in the substrate. In NPN BJTs, the collector is formed as an n-well in a p-type substrate and is susceptible to picking up minority carrier noise from the substrate. Neither NPN BJTs nor PNP BJTs allow full isolation from substrate noise.

In some approaches, complementary metal oxide semiconductor (CMOS) devices are used to form the voltage reference. In some instances, the CMOS devices are fabricated in a triple well flow such that every CMOS device is reverse-junction-isolated from the main substrate. In some approaches, a CMOS device includes a polysilicon gate feature which is doped using an opposite dopant type from a dopant in the substrate for the CMOS device.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

The following disclosure provides many different embodiments, or examples, for implementing different features of the invention. Specific examples of components and arrangements are described below to simplify the present disclosure. These are examples and are not intended to be limiting.

Figure 1:
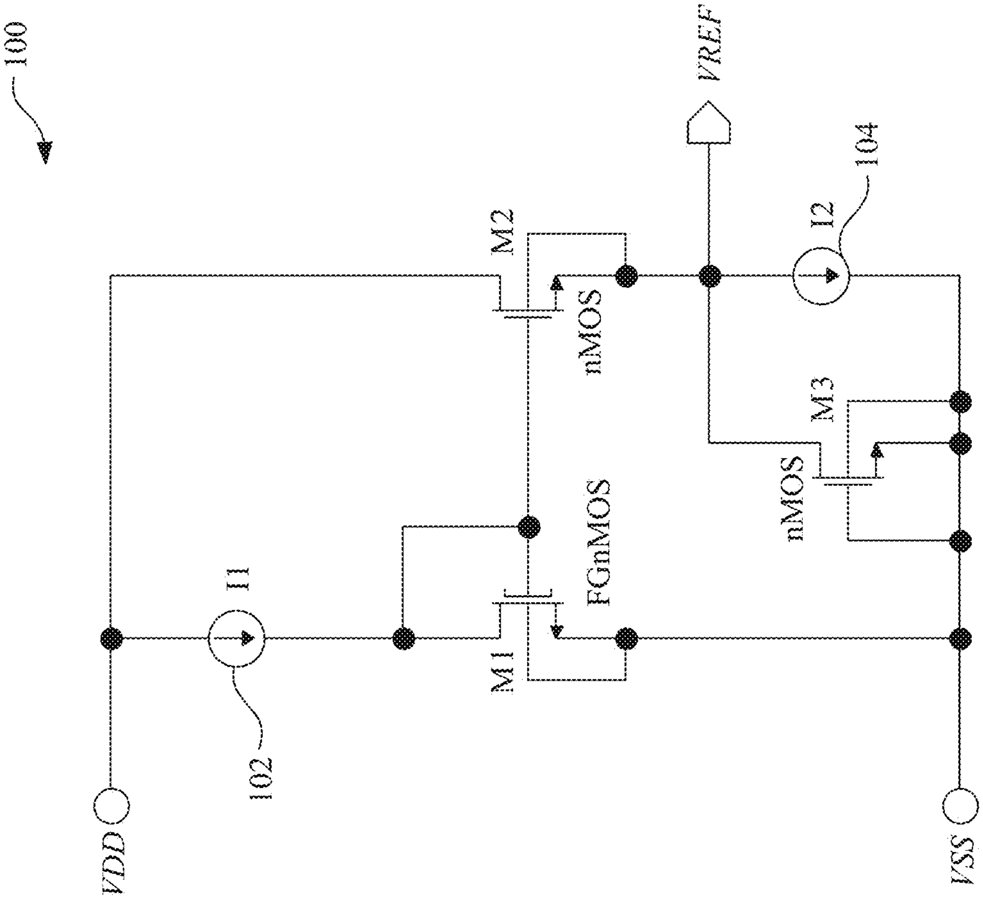
FIG. 1 is a schematic diagram of a voltage reference in accordance with some embodiments.

FIG. 1 is a schematic diagram of a voltage reference 100 in accordance with one or more embodiments. Voltage reference 100 includes a flipped gate transistor M1 between an operating voltage VDD and a negative supply voltage VSS. A first current source 102 is configured to supply a first current I1 across flipped gate transistor M1. A transistor M2 is connected between operating voltage VDD and negative supply voltage VSS. Transistor M2 is connected to flipped gate transistor M1 in a Vgs subtractive arrangement. The Vgs subtractive arrangement results from a gate of transistor M2 and flipped gate transistor M1 receiving a same voltage and a source terminal of the flipped gate transistor connected to negative supply voltage VSS. A second current source 104 is configured to supply a second current I2 across transistor M2. A transistor M3 is connected between transistor M2 and negative supply voltage VSS. Each of a gate, a source terminal, and a bulk of transistor M3 are connected to negative supply voltage VSS. An output node for outputting a reference voltage Vref is located between transistor M2 and negative supply voltage VSS and is connected to a drain terminal of transistor M3.

Flipped gate transistor M1 is used to help produce a temperature independent reference voltage Vref. Flipped gate transistor M1 includes a gate electrode which is anti-doped. Anti-doping is a process of doping the gate electrode with a dopant type which is the same as a substrate of flipped gate transistor M1. For example, in a conventional n-type metal oxide semiconductor (NMOS), the substrate is p-doped and the gate electrode is n-doped. However, in a flipped gate NMOS, a portion of the gate electrode is p-doped.

Figure 2:
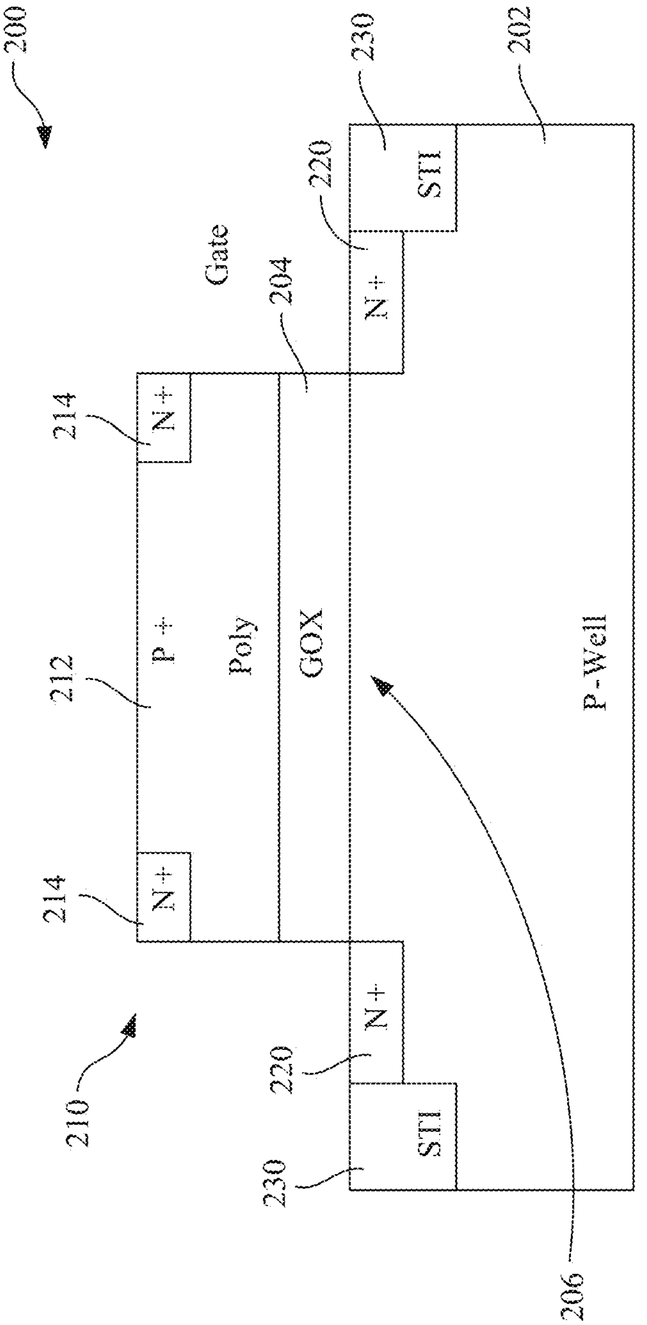
FIG. 2 is a cross sectional view of a flipped gate transistor in accordance with some embodiments.

FIG. 2 is a cross sectional view of a flipped gate transistor 200 in accordance with one or more embodiments. Flipped gate transistor 200 is an n-type flipped gate transistor. Flipped gate transistor 200 includes a substrate 202. A gate dielectric layer 204 is over a channel region 206 of substrate 202. A gate electrode 210 is over gate dielectric layer 204. A body region 212 of gate electrode 210 is doped with p-type dopants. Edges 214 of gate electrode 210 are n-doped for self aligned formation of n-doped source/drain (S/D) features 220. Isolation regions 230 are positioned between adjacent flipped gate transistors, in some embodiments. In some embodiments, gate electrode 210 includes doped polysilicon, a metal gate or another suitable gate material. In some embodiments, the p-type dopants include boron, boron di-fluoride, or other suitable p-type dopants. In some embodiments, the n-type dopants include arsenic, phosphorous, or other suitable n-type dopants.

Returning to FIG. 1, the gate of flipped gate transistor M1 is connected to a drain terminal of the flipped gate transistor. A bulk of flipped gate transistor M1 is connected to the source terminal of the flipped gate transistor. In some embodiments, flipped gate transistor M1 is substantially p-doped. Substantially p-doped means that a gate electrode of flipped gate transistor M1 is p-doped except at edges of the gate electrode. The edges of the gate electrode of flipped gate transistor M1 are n-typed to facilitate forming of the drain and source terminals of the flipped gate transistor.

First current source 102 is configured to supply the first current I1 to flipped gate transistor M1. In some embodiments, first current source 102 includes at least one current mirror. In some embodiments, first current source 102 includes a startup device and a current generation device, or another suitable current source.

Transistor M2 is used to help produce the temperature independent reference voltage Vref. Transistor M2 is not a flipped gate transistor. In some embodiments, transistor M2 is a standard NMOS transistor. The gate of transistor M2 is connected to the gate of flipped gate transistor M1. A drain terminal of transistor M2 is connected to operating voltage VDD. A bulk of transistor M2 is connected to the source terminal of the transistor.

Flipped gate transistor M1 has a first size defined by a width and a length of the flipped gate transistor. Transistor M2 has a second size defined by a width and a length of the transistor. The size of transistor M2 is greater than a size of flipped gate transistor M1. The size of transistor M2 is an integer multiple N of the size of flipped gate transistor M1. In some embodiments, the integer multiple N ranges from about 2 to about 50. A size difference between transistor M2 and flipped gate transistor M1 helps determine a temperature dependence of reference voltage Vref. Proper sizing of transistor M2 relative to flipped gate transistor M1 results in a temperature independent reference voltage Vref.

First current source 102 is configured to provide the first current I1 to flipped gate transistor M1. Second current source 104 is configured to provide the second current I2 to transistor M2. A least common denominator current ($I_{LCD}$) is defined based on a ratio of the first current I1 to the second current I2. For example, a ratio of the first current I1 to the second current I2 being 11:2 results in a least common denominator current of 1. A ratio of the first current I1 to the second current I2 being 8:4 results in a least common denominator current of 4. The first current I1 is a first integer multiple (K1) of the $I_{LCD}$. The second current I2 is also a second integer multiple (K2) of the $I_{LCD}$. The first integer multiple K1 is greater than the second integer multiple K2. In some embodiments, the first integer multiple K1 is about two times greater than the second integer multiple K2. In some embodiments, the first integer multiple K1 is more than two times greater than the second integer multiple K2.

The integer multiple N is determined at least in part by first integer multiple K1 and second integer multiple K2. Tuning of integer multiple N enables adjustment of temperature dependency of reference voltage Vref. Tuning the integer multiple N so that the $\Delta V_{gs}$ of flipped gate transistor M1 and transistor M2 is approximately equal to the bandgap voltage of a semiconductor-based material used in a production process to form voltage reference 100 results in temperature independence of reference voltage Vref.

Transistor M3 is used to remove a channel leakage component of a drain source current running through transistor M2. A size of transistor M3 is equal to a size of transistor M2. Any leakage current through transistor M2 is directed to transistor M3 to help maintain the second current I2 for the purpose of temperature compensation of the reference voltage Vref. The addition of transistor M3 to compensate for leakage through transistor M2 helps to use an entirety of the second current I2 for the purpose of temperature compensation for reference voltage Vref. This leakage cancellation is most effective when the drain-source voltage of M2 is equal to the drain-source voltage of M3, which happens when operating voltage VDD is set at a value given by 2Vref. In approaches that do not include transistor M3, accuracy of the voltage reference rapidly degrades at temperatures above 80° C.

Figure 3:
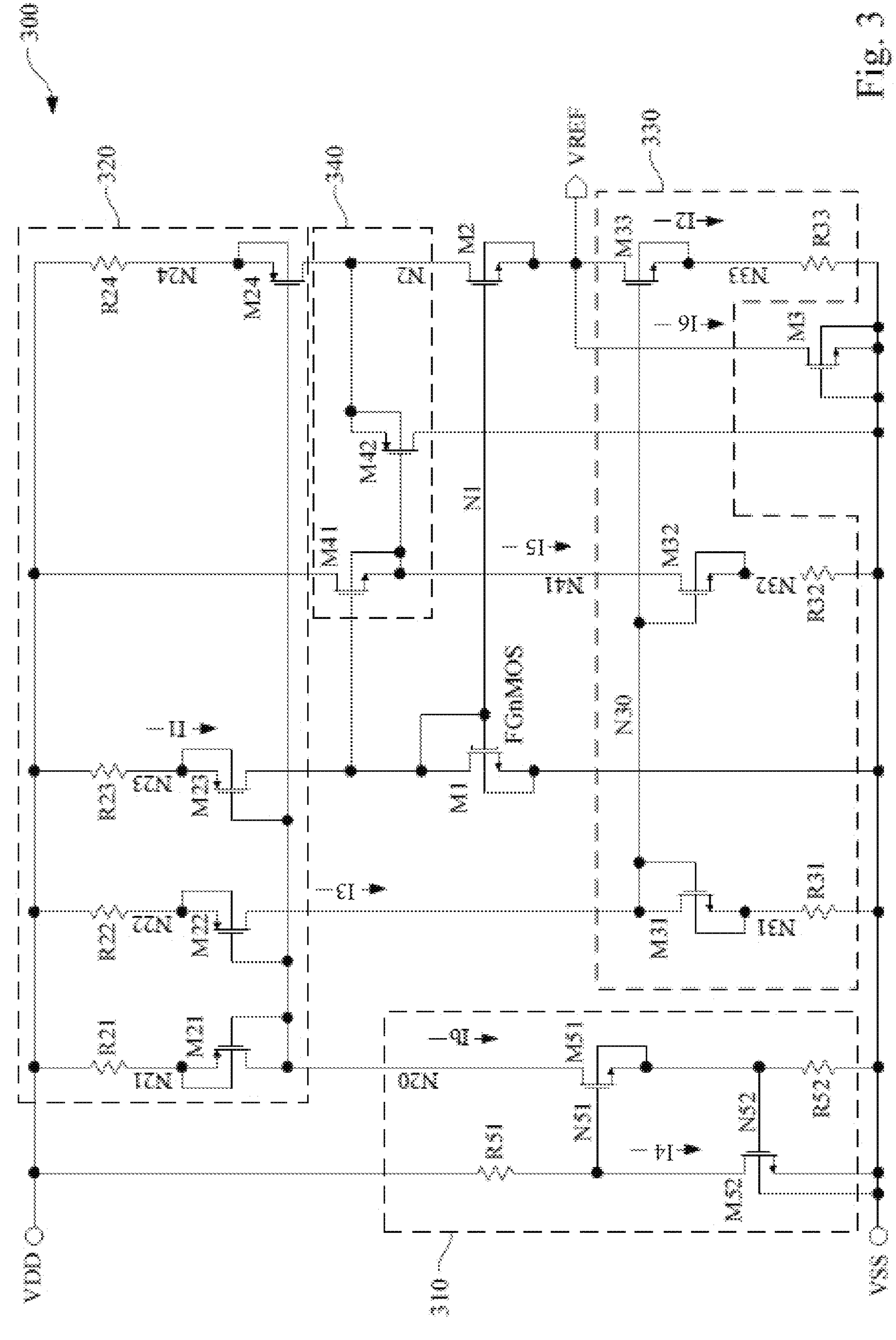
FIG. 3 is a schematic diagram of a voltage reference in accordance with one or more embodiments.

FIG. 3 is a schematic diagram of a voltage reference 300 in accordance with one or more embodiments. Voltage reference 300 includes flipped gate transistor M1, transistor M2 and transistor M3 similar to voltage reference 100. Voltage reference 300 further includes a startup and bias current generator region 310 configured to receive an input voltage and to generate a bias current Ib. A first current mirror region 320 is configured to generate the first current I1 for flipped gate transistor M1 based on the bias current Ib from startup and bias current generator 310. A second current mirror region 330 is configured to receive a mirrored portion 13 of the first current I1 and generate the second current I2 for transistor M2. A voltage boxing region 340 is configured to maintain a voltage drop across transistor M2 approximately equal to reference voltage Vref.

In some embodiments, startup and bias current generator region 310 is omitted. In some embodiments where startup and bias current generator region 310 is omitted, voltage reference 300 is configured to receive the bias current Ib from an external current source.

Startup and bias current generator region 310 is configured to receive an operating voltage VDD. Startup and bias current generator 310 is connected between the operating voltage VDD and a negative supply voltage VSS. Startup and bias current generator region 310 is configured to generate the bias current Ib along a first line connected to first current mirror region 320. First current mirror region 320 is configured to receive the operating voltage VDD. A second line connected to first current mirror region 320 is connected in series to second current mirror region 330. A third line connected to first current mirror region 320 is connected in series to flipped gate transistor M1. A fourth line connected to operating voltage VDD through first current mirror region 320 is connected to a first portion of voltage boxing region 340. A fifth line connected to first current mirror region 320 is connected in series with transistor M2. A second portion of voltage boxing region 340 is connected to negative supply voltage VSS through second current mirror region 330. In some embodiments, the operating voltage VDD is greater than twice the reference voltage Vref. In some embodiments, negative supply voltage VSS is equal to 0 V. In some embodiments, negative supply voltage VSS is greater or less than 0 V such that operating voltage VDD is always referenced to negative supply voltage VSS.

Startup and bias current generator region 310 is configured to generate the bias current Ib for use by voltage reference 300. Startup and bias current generator region 310 includes a startup resistor R51 configured to receive operating voltage VDD. A first bias transistor M52 is connected in series with startup resistor R51. A bias resistor R52 is connected in series to a second bias transistor M51. Bias resistor R52 is connected to negative supply voltage VSS. A gate of first bias transistor M52 is connected to a node between second bias transistor M51 and bias resistor R52. A gate of second bias transistor M51 is connected to a node between startup resistor R51 and first bias transistor M52. A source terminal of first bias transistor M52 is connected to negative supply voltage VSS. A drain terminal of second bias transistor M51 is connected in series with first current mirror region 320. In some embodiments, first bias transistor M52 is an NMOS transistor. In some embodiments, second bias transistor M51 is an NMOS transistor. In some embodiments, first bias transistor M52 and second bias transistor M51 are in a weak inversion state. A weak inversion state means a gate-source voltage Vgs of a transistor is below a threshold voltage of the transistor.

Startup resistor R51 is used to provide a direct path from the operating voltage VDD to the gate of second bias transistor M51 in order to begin operation of voltage reference 300. A voltage across bias resistor R52 is at least partially defined based on a gate-source voltage Vgs of first bias transistor M52. The Vgs of first bias transistor M52 is defined at least in part by a voltage utilized to conduct the startup current across startup resistor R51. The startup current I4 of voltage reference 300 is provided by the equation (VDD−V(N51))/r51, where VDD is the operating voltage, r51 is a corresponding resistance of startup resistor R51, and V(N51) is given by a sum of a gate-source voltage Vgs of first bias transistor M52 and a gate-source voltage Vgs of second bias transistor M51. The bias current Ib is conducted across second bias transistor M51 along the first line to current mirror region 320 and is given by the equation V(N52)/r52, where V(N52) is gate-source voltage Vgs of first bias transistor M52 and r52 is a corresponding resistance of bias resistor R52.

First current mirror region 320 is used to provide an integer-ratio multiple of the bias current Ib to flipped gate transistor M1. First current mirror region 320 includes a first mirror transistor M21 connected in series with a first mirror resistor R21. First mirror resistor R21 is connected to the operating voltage VDD. First mirror transistor M21 is diode-connected. A drain terminal of first mirror transistor M21 is connected to second bias transistor M51 along the first line. A second mirror transistor M22 is connected in series with a second mirror resistor R22. Second mirror resistor R22 is connected to the operating voltage VDD. A gate of second mirror transistor M22 is connected to a gate of first mirror transistor M21. A drain terminal of second mirror transistor M22 is connected to second current mirror region 330 along the second line. A third mirror transistor M23 is connected in series with a third mirror resistor R23. Third mirror resistor R23 is connected to the operating voltage VDD. A gate of third mirror transistor is connected to the gate of first mirror transistor M21. A drain terminal of third mirror transistor M23 is connected to flipped gate transistor M1 along the third line. A fourth mirror transistor M24 is connected in series with a fourth mirror resistor R24. Fourth mirror resistor R24 is connected to the operating voltage VDD. A gate of fourth mirror transistor M24 is connected to the gate of first mirror transistor M21. A drain terminal of fourth mirror transistor M24 is connected to voltage boxing region 340 along the fifth line. The drain terminal of fourth mirror transistor M24 is also connected to transistor M2 along the fifth line. In some embodiments, each of first mirror transistor M21, second mirror transistor M22, third mirror transistor M23 and fourth mirror transistor M24 are PMOS transistors.

First current mirror region 320 is configured to receive the bias current Ib from startup and bias current generator region 310 along the first line and mirror the bias current Ib along the second line, the third line and the fifth line. A size of first mirror transistor M21 is defined as an integer multiple of a first transistor unit size for the first mirror transistor M21, second mirror transistor M22, third mirror transistor M23 and fourth mirror transistor M24. Second mirror transistor M22, third mirror transistor M23 and fourth mirror transistor M24 independently have a size which is an integer multiple of the first transistor unit size.

A resistance of first mirror resistor R21 is defined based on the bias current Ib conducted across first mirror transistor M21 such that the voltage drop across the terminals of R21 is greater than 150 mV. Second mirror resistor R22, third mirror resistor R23 and fourth mirror resistor R24 independently have a resistance which is based on the integer-ratio multiples of the first transistor unit size. By using the first transistor unit size, a current mirrored across each of the mirror transistors of first current mirror region is a ratio of the integer multiples of the relative sizes of the transistors multiplied by current Ib across the first mirror transistor. A current I22 across second mirror transistor M22 is given by (n22/n21)×Ib, where n22 is an integer multiple of the first transistor unit size for second mirror transistor M22, n21 is an integer multiple of the first transistor unit size for first mirror transistor M21, and Ib is the current across the first mirror transistor. A current I1 across third mirror transistor M23 is given by (n23/n21)×Ib, where n23 is an integer multiple of the first transistor unit size for third mirror transistor M23. A current I24 across fourth mirror transistor M24 is given by (n24/n21)×Ib, wherein n24 is an integer multiple of the first transistor unit size for fourth mirror transistor M24.

By using the first transistor unit size, a resistance across each of the mirror resistors of first current mirror region is a ratio of the integer multiples of the relative sizes of the transistors multiplied by a resistance r21 corresponding to first mirror resistor R21. A resistance r22 corresponding to second mirror resistor R22 is given by (n21/n22)×r21, where n22 is an integer multiple of the first transistor unit size for second mirror transistor M22, n21 is an integer multiple of the first transistor unit size for first mirror transistor M21, and r21 is the resistance corresponding to the first mirror resistor. A resistance r23 corresponding to third mirror resistor R23 is given by (n21/n23)×r21, where n23 is an integer multiple of the first transistor unit size for third mirror transistor M23. A resistance r24 corresponding to fourth mirror resistor R24 is given by (n21/n24)×r21, wherein n24 is an integer multiple of the first transistor unit size for fourth mirror transistor M24.

Adjusting sizes of the mirror transistors M21-M24 and the mirror resistor R21-R24 of first current mirror region 320 enables tuning of the current across flipped gate transistor M1, e.g., first current I1 (FIG. 1), as well as along the other lines of the first current mirror. For example, third mirror transistor M23 and third mirror resistor R23 determine the current across flipped gate transistor M1. In another example, second mirror transistor M22 and second mirror resistor R22 determine the current supplied to second mirror region 330. In an additional example, fourth mirror transistor M24 and fourth mirror resistor R24 determine the current across transistor M2 and across second portion of voltage boxing region 340. Tuning of the current across flipped gate transistor M1 helps to increase accuracy and temperature independence of reference voltage Vref output by voltage reference 300. The mirror transistors M21-M24 of first current mirror region 320 are capable of accurately mirroring currents at nano-amp current levels.

Second current mirror region 330 is configured to mirror a current from first current mirror region 320. Second current mirror region 330 includes fifth mirror transistor M31 connected in series with fifth mirror resistor R31. Fifth mirror resistor R31 is connected to negative supply voltage VSS. Fifth mirror transistor M31 is diode-connected. A drain terminal of fifth mirror transistor M31 is connected to second mirror transistor M22 along the second line. Second current mirror region 230 further includes a sixth mirror transistor M32 connected in series with a sixth mirror resistor R32. Sixth mirror resistor R32 is connected to negative supply voltage VSS. A gate of sixth mirror transistor M32 is connected to a gate of fifth mirror transistor M31. A drain terminal of sixth mirror transistor M32 is connected to voltage boxing region 340 along the fourth line. Second current mirror region 230 further includes a seventh mirror transistor M33 connected in series with a seventh mirror resistor R33. Seventh mirror resistor R33 is connected to negative supply voltage VSS. A gate of seventh mirror transistor M33 is connected to a gate of fifth mirror transistor M31 and the gate of sixth mirror transistor M32. A drain terminal of seventh mirror transistor M33 is connected to transistor M2 and to transistor M3 along the fifth line. In some embodiments, each of fifth mirror transistor M31, sixth mirror transistor M32 and seventh mirror transistor M33 are NMOS transistors.

Second current mirror region 330 is configured to receive current I22 from first current mirror region 320 along the second line and mirror current I22 along the fourth line and along the fifth line. A size of fifth mirror transistor M31 is defined as an integer multiple of a second transistor unit size. Sixth mirror transistor M32 has a size which is an integer multiple of the second transistor unit size. Seventh mirror transistor M33 also has a size which is an integer multiple of the second transistor unit size. In some embodiments, the first transistor unit size is equal to the second transistor unit size. In some embodiments, the first transistor unit size is different from the second transistor unit size.

A resistance of fifth mirror resistor R31 is defined based on the current conducted across fifth mirror transistor M31 such that the voltage drop across the terminals of R31 is greater than 150 mV. Sixth mirror resistor R32 has a resistance which is based on the integer multiples of the second transistor unit size. Seventh mirror resistor R33 also has a resistance which is based on the integer multiples of the second transistor unit size.

By using the second transistor unit size, a current mirrored across each of the mirror transistors of second current mirror region 330 is a ratio of the integer multiples of the relative sizes of the transistors multiplied by mirrored portion 13 across fifth mirror transistor M31. A current I5 across sixth mirror transistor M32 is given by (n32/n31)×I22, where n32 is an integer multiple of the second transistor unit size for sixth mirror transistor M32, n31 is an integer multiple of the second transistor unit size for fifth mirror transistor M31, and I22 is the current across the fifth mirror transistor. A current I2 across seventh mirror transistor M33 is given by (n33/n31)×I22, where n33 is an integer multiple of the second transistor unit size for seventh mirror transistor M33.

By using the second transistor unit size, a resistance across each of the mirror resistors of second current mirror region 330 is a ratio of the integer multiples of the relative sizes of the transistors multiplied by a resistance r31 corresponding to fifth mirror resistor R31. A resistance r32 corresponding to sixth mirror resistor R32 is given by (n31/n32)×r31, where n32 is an integer multiple of the second transistor unit size for sixth mirror transistor M32, n31 is an integer multiple of the second transistor unit size for fifth mirror transistor M31, and r31 is the resistance corresponding to the fifth mirror resistor R31. A resistance r33 corresponding to seventh mirror resistor R33 is given by (n31/n33)×r31, where n33 is an integer multiple of the second transistor unit size for sixth mirror transistor M33.

Adjusting sizes of the mirror transistors M31-M33 as well as the mirror resistors R31-R33 of second current mirror region 330 enables tuning of the current across transistor M2, e.g., second current I2 (FIG. 1). For example, sixth mirror transistor M32 and sixth mirror resistor R32 determine the current I5 across a first portion of voltage boxing region 340. In another example, seventh mirror transistor M33 and seventh mirror resistor R33 determine the current I2 across transistor M2. Tuning of the current across transistor M2 helps to increase accuracy and temperature independence of reference voltage Vref output by voltage reference 300. The mirror transistors M31-M33 of second current mirror region 330 are capable of accurately mirroring currents at nano-amp current levels.

Voltage boxing region 340 is configured to maintain a voltage drop across transistor M2 approximately equal to reference voltage Vref. Voltage boxing region 340 includes a first boxing transistor M41. A source terminal of first boxing transistor M41 is connected to sixth mirror transistor M32 along the fourth line. A gate of first boxing transistor M41 is connected to the drain terminal of flipped gate transistor M1 and is configured to receive current I1. A drain terminal of first boxing transistor M41 is connected to the operating voltage VDD. In some embodiments, first boxing transistor M41 is an NMOS transistor. Voltage boxing region 340 further includes a second boxing transistor M42. A source terminal of second boxing transistor M42 is connected to the drain terminal of transistor M2 along the fifth line. A drain terminal of second boxing transistor M42 is connected to the negative supply voltage VSS. A gate of second boxing transistor M42 is connected to a source terminal of first boxing transistor M41 and is configured to receive current I5. In some embodiments, second boxing transistor M42 is a PMOS transistor.

First boxing transistor M41 is a level-shifting source follower. First boxing transistor M41 is biased by current I5 from second current mirror region 330. First boxing transistor M41 is configured to perform level-shifting in a direction of the negative supply voltage VSS. Second boxing transistor M42 is also a level-shifting source follower. Second boxing transistor M42 is biased by a difference between a current across fourth mirror transistor M24 and current I2 across transistor M2. Current I2 across transistor M2 is less than the current across fourth mirror transistor M24. Second boxing transistor M42 is configured to perform level-shifting in a direction of the operating voltage VDD.

First boxing transistor M41 has a size larger than a size of second boxing transistor M42. A level-shift from the gate of first boxing transistor M41 to the source terminal of second boxing transistor M42 is a positive value, due to the size difference between the first boxing transistor and the second boxing transistor as well as the current difference between current I5 and the current across second boxing transistor M42. The positive value of the level-shifting to the source terminal of second boxing transistor M42 helps to provide a voltage level at the source terminal of the second boxing transistor M42 suitable to approximately match a leakage current of transistor M2 to a leakage current I6 of transistor M3. By matching the leakage current of transistor M2 to the leakage current I6 of M3, reference voltage Vref output by voltage reference 300 is maintained at a constant level for all temperature values, i.e., reference voltage Vref is temperature independent. In some embodiments, a voltage level at the source terminal of second boxing transistor M42 is approximately equal to twice (2Vref) the reference voltage Vref.

In comparison with other boxing regions, voltage boxing region 340 uses negative level-shifting by first boxing transistor M41 followed by positive level-shifting by second boxing transistor M42 in order to reduce or eliminate head-room penalty for voltage reference 300. Head-room penalty is a difference between the operating voltage VDD and an output voltage of voltage reference 300. As the head-room penalty increases, power consumption of voltage reference 300 increases. By reducing the head-room penalty, applicability of voltage reference 300 increases. For example, reduced head-room penalty increases compatibility of voltage reference 300 with lithium-ion batteries or other low voltage power supplies.

Figure 4:
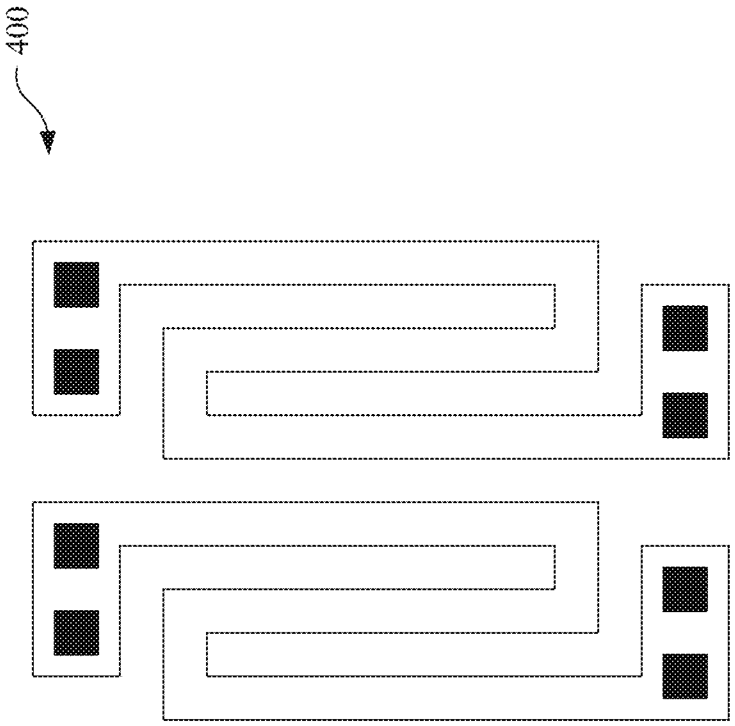
FIG. 4 is a top view of a resistor arrangement in accordance with some embodiments.

FIG. 4 is a top view of a resistor arrangement 400 in accordance with one or more embodiments. Resistor arrangement 400 has a serpentine structure. Resistor arrangement 400 includes polysilicon, thin film silicon chromium or another suitable resistive material. A minimum width of the polysilicon in resistor arrangement 400 is defined by a critical dimension of a formation process. The critical dimension is a smallest dimension which can reliably be formed using the formation process. In some embodiments, resistor arrangement 400 is formed using a lithography process. By including the serpentine structure and width based on the critical dimension, resistor arrangement 400 has a higher resistance per unit area in comparison with other approaches which use wider elements or straight-line layouts. In some embodiments, a resistance of resistor arrangement 400 is on the order of 1 Mega Ohm (MΩ) or greater. In some embodiments, resistor arrangement 400 is used as a resistor unit size for resistors in a voltage reference, e.g., voltage reference 300 (FIG. 3). For example, if resistance r21 corresponding to first mirror resistor R21 is 3 MΩ and the unit resistor size of resistor arrangement 400 is 1 MΩ, the first mirror resistor is formed using three serial connected resistor arrangements, in some embodiments. The voltage drop across resistor arrangement 400 is set at a sufficiently high level to provide current matching in a current mirror, e.g., first current mirror region 320 or second current mirror region 330 (FIG. 3), and to enable the formation of accurate current mirrors at nanopower levels. In some embodiments, a voltage drop across resistor arrangement 400 is equal to or greater than 150 millivolts (mV). In some embodiments, at least one resistor of mirror resistors R21-R24 or R31-R33 is formed having resistor arrangement 400. In some embodiments, all mirror resistors R21-R24 and R31-R33 are formed having resistor arrangement 400. Due to the use of nanopower levels, resistances of resistors in voltage reference 300 are set as high as possible, in some embodiments.

Figure 5:
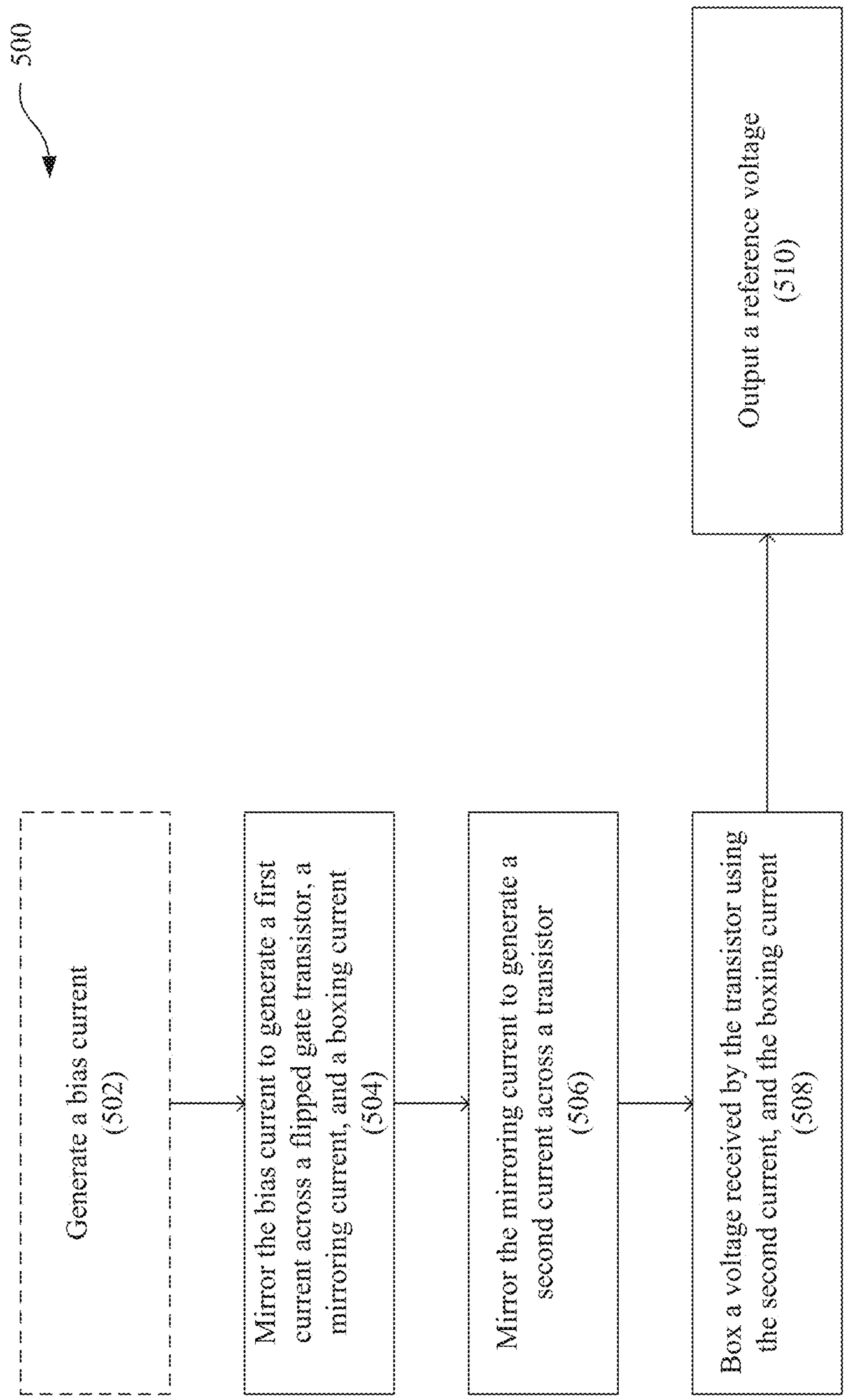
FIG. 5 is a flow chart of a method of using a voltage reference in accordance with some embodiments.

FIG. 5 is a flowchart of a method 500 of using a voltage reference in accordance with one or more embodiments. Method 500 begins with optional operation 502 in which a bias current is generated. In some embodiments, the bias current is generated using a startup and bias current generator, e.g., startup and bias current generator region 310 (FIG. 3). The bias current provides a basis for scaling of other currents throughout the voltage reference, e.g., voltage reference 100 (FIG. 1) or voltage reference 300. In some embodiments, the startup current is generated based on an operating voltage, e.g., operation voltage VDD, of the voltage reference. In some embodiments, the bias current is generated based on a gate source voltage of a bias transistor, e.g., first bias transistor M52, divided by a resistance across a bias resistor, e.g., bias resistor R51.

In some embodiments, optional operation 502 is omitted. In some embodiments where optional operation 502 is omitted, the bias current is provided by an external current source.

Method 500 continues with operation 504 in which the bias current is mirrored to generate a first current across a flipped gate transistor, a mirroring current, and a boxing current. The first current across the flipped gate transistor, e.g., flipped gate transistor M1 (FIGS. 1 and 3), is determined based on a transistor unit size, e.g., the first transistor unit size. In some embodiments, the bias current is mirrored using a first current mirror, e.g., first current mirror region 320 (FIG. 3). In some embodiments, a ratio between the first current and the bias current is selected by adjusting the sizes of mirroring transistors and mirroring resistors within the first current mirror. The mirroring current is generated along a different line from the first current. In some embodiments, the mirroring current is equal to the first current. In some embodiments, the mirroring current is different from the first current. In some embodiments, a ratio between the first current and the boxing current is selected by adjusting the sizes of mirroring transistors and mirroring resistors within the first current mirror. The boxing current is generated along a different line from the first current. In some embodiments, the boxing current is equal to the first current. In some embodiments, the boxing current is different from the first current.

In operation 506, the mirroring current is mirrored to generate a second current across a transistor. The second current is based on a ratio of integer multiples of a transistor unit size, e.g., the second transistor unit size, across the transistor, e.g., transistor M2 (FIGS. 1 and 3). In some embodiments, the first current is mirrored using a second current mirror, e.g., second current mirror region 330 (FIG. 3). In some embodiments, a ratio between the first current and the second current is selected by adjusting the sizes of mirror transistors and mirror resistors within the second current mirror. In some embodiments, the first current is twice the second current. In some embodiments, the flipped gate transistor receiving the first current is smaller than the transistor receiving the second current.

Method 500 continues with operation 508 in which a voltage received by the transistor is boxed using the second current, and the boxing current. The voltage is boxed to compensate for leakage current across the transistor. In some embodiments, the voltage is boxed using a voltage boxing circuit, e.g., voltage boxing region 340 (FIG. 3). In some embodiments, the voltage boxing circuit includes dual source followers. In some embodiments, the voltage is boxed so that a voltage received by the flipped gate transistor is less than a voltage received by the transistor receiving the second current. In some embodiments, the voltage is boxed by performing a negative level-shifting using a first boxing transistor, e.g., first boxing transistor M41 (FIG. 3), followed by a positive level-shifting using a second boxing transistor, e.g., second boxing transistor M42.

In operation 510, a reference voltage is output. The reference voltage, e.g., reference voltage Vref (FIGS. 1 and 3), is temperature independent. The reference voltage is usable by external circuitry for performing comparisons. In some embodiments, the reference voltage is less than half of the operating voltage of the voltage reference.

One of ordinary skill in the art would recognize that additional operations are able to be included in method 500, that operations are able to be omitted, and an order of operations are able to be re-arranged without departing from the scope of this description.

In some embodiments, a voltage reference includes an operating voltage node, a first PMOS transistor including a gate and a drain terminal, each coupled to an input node, and a source terminal coupled to the operating voltage node through a first resistor, second through fourth PMOS transistors, each including a gate coupled to the input node and a source terminal coupled to the operating voltage node through a respective one of second through fourth resistors, an n-type flipped gate transistor including a gate and a drain terminal, each coupled to a drain terminal of the second PMOS transistor, and a source terminal coupled to a negative supply voltage node, a first NMOS transistor including a gate coupled to the gate of the n-type flipped gate transistor, a drain terminal coupled to a drain terminal of the third PMOS transistor, and a source terminal coupled to an output node, a second NMOS transistor including a gate coupled to a drain terminal of the fourth PMOS transistor, a drain terminal coupled to the output node, and a source terminal coupled to the negative supply voltage node through a fifth resistor, and a third NMOS transistor including a drain terminal coupled to the output node, and a gate and a source terminal, each coupled to the negative supply voltage node. In some embodiments, the voltage reference includes a fourth NMOS transistor including a gate and a drain terminal, each coupled to the gate of the second NMOS transistor, and a source terminal coupled to the negative supply voltage node through a sixth resistor. In some embodiments, the voltage reference includes a fourth NMOS transistor including a gate coupled to the operating voltage node through a sixth resistor, a drain terminal coupled to the input node, and a source terminal coupled to the negative supply voltage node through a seventh resistor, and a fifth NMOS transistor including a gate coupled to the source terminal of the fourth NMOS transistor, a drain terminal coupled to the gate of the fourth NMOS transistor, and a source terminal coupled to the negative supply voltage node. In some embodiments, the input node is coupled to an external current source. In some embodiments, a bulk of the n-type flipped gate transistor is coupled to the negative supply voltage node and a bulk of the third NMOS transistor is coupled to the negative supply voltage node. In some embodiments, a gate electrode of the gate of the n-type flipped gate transistor includes a body region including p-type dopants and edges including n-type dopants. In some embodiments, each of the first through fifth resistors includes a series of one or more unit resistors and each unit resistor includes a serpentine structure having a resistance of one megaohm or greater.

In some embodiments, a voltage reference includes an operating voltage node, a first PMOS transistor including a gate and a drain terminal, each coupled to an input node, and a source terminal coupled to the operating voltage node through a first resistor, second through fourth PMOS transistors, each including a gate coupled to the input node and a source terminal coupled to the operating voltage node through a respective one of second through fourth resistors, an n-type flipped gate transistor including a gate and a drain terminal, each coupled to a drain terminal of the second PMOS transistor, and a source terminal coupled to a negative supply voltage node, a first NMOS transistor including a gate coupled to the gate of the n-type flipped gate transistor, a drain terminal coupled to a drain terminal of the third PMOS transistor, and a source terminal coupled to an output node, a second NMOS transistor including a gate coupled to a drain terminal of the fourth PMOS transistor, a drain terminal coupled to the output node, and a source terminal coupled to the negative supply voltage node through a fifth resistor, a third NMOS transistor including a drain terminal coupled to the output node, and a gate and a source terminal, each coupled to the negative supply voltage node, a fifth PMOS transistor including a source terminal coupled to the drain terminals of the third PMOS transistor and first NMOS transistor, and a drain terminal coupled to the negative supply voltage node, and a fourth NMOS transistor including a gate coupled to the gates of the n-type flipped gate transistor and first NMOS transistor, a drain terminal coupled to the operating voltage node, and a source terminal coupled to a gate of the fifth PMOS transistor. In some embodiments, the voltage reference includes a fifth NMOS transistor including a gate and a drain terminal, each coupled to the gate of the second NMOS transistor, and a source terminal coupled to the negative supply voltage node through a sixth resistor, and a sixth NMOS transistor including a gate coupled to the gate of the second NMOS transistor, a drain terminal coupled to the gate of the fifth PMOS transistor, and a source terminal coupled to the negative supply voltage node through a seventh resistor. In some embodiments, the first through fifth PMOS transistors, the first through sixth NMOS transistors, and the first through seventh resistors are configured to generate a voltage level at the source terminal of the fifth PMOS transistor approximately equal to twice a voltage level at the output node. In some embodiments, each of the first through seventh resistors includes a series of one or more unit resistors, and each unit resistor includes a serpentine structure having a resistance of one megaohm or greater. In some embodiments, the voltage reference includes a fifth NMOS transistor including a gate coupled to the operating voltage node through a sixth resistor, a drain terminal coupled to the input node, and a source terminal coupled to the negative supply voltage node through a seventh resistor, and a sixth NMOS transistor including a gate coupled to the source terminal of the fifth NMOS transistor, a drain terminal coupled to the gate of the fifth NMOS transistor, and a source terminal coupled to the negative supply voltage node. In some embodiments, the input node is coupled to an external current source. In some embodiments, a bulk of the n-type flipped gate transistor is coupled to the negative supply voltage node, a bulk of the first NMOS transistor is coupled to the output node, and a bulk of the third NMOS transistor is coupled to the negative supply voltage node.

In some embodiments, a method of operating a voltage reference includes receiving an operating voltage at an operating voltage node, using a gate and a drain terminal of a first PMOS transistor to couple an input node to the operating voltage node through a source terminal of the first PMOS transistor and a first resistor, using the input node to control second through fourth PMOS transistors, each including a gate coupled to the input node and a source terminal coupled to the operating voltage node through a respective one of second through fourth resistors, using a gate and a drain terminal of an n-type flipped gate transistor to couple a drain terminal of the second PMOS transistor to a negative supply voltage node, using a first NMOS transistor including a gate coupled to the gate of the n-type flipped gate transistor to couple a drain terminal of the third PMOS transistor to an output node through the drain terminal of the first NMOS transistor coupled to the drain terminal of the third PMOS transistor and a source terminal of the first NMOS transistor coupled to the output node, using a gate of a second NMOS transistor coupled to a drain terminal of the fourth NMOS transistor to couple the output node to the negative supply voltage node through a drain terminal of the second NMOS transistor coupled to the output node and a source terminal coupled to the negative supply voltage node through a fifth resistor, and using a gate and a source terminal of a third NMOS transistor to couple the negative supply voltage node to the output node through a drain terminal of the third NMOS transistor coupled to the output node. In some embodiments, the method includes using a fifth PMOS transistor to couple the drain terminals of the third PMOS transistor and first NMOS transistor to the negative supply voltage node through a source terminal of the fifth PMOS transistor coupled to the drain terminals of the third PMOS transistor and first NMOS transistor and a drain terminal of the fifth NMOS transistor coupled to the negative supply voltage node, and using a fourth NMOS transistor to control the fifth PMOS transistor by a gate of the fourth NMOS transistor coupled to the gates of the n-type flipped gate transistor and first NMOS transistor, a drain terminal of the fourth NMOS transistor coupled to the operating voltage node, and a source terminal of the fourth NMOS transistor coupled to a gate of the fifth PMOS transistor. In some embodiments, the method includes using a gate and a drain terminal of a fifth NMOS transistor to couple the gate of the second NMOS transistor to the negative supply voltage node through a source terminal of the fifth NMOS transistor and a sixth resistor, and using a sixth NMOS transistor to couple the gate of the fifth PMOS transistor to the negative supply voltage node by a gate of the sixth NMOS transistor coupled to the gate of the second NMOS transistor, a drain terminal of the sixth NMOS transistor coupled to the gate of the fifth PMOS transistor, and a source terminal of the sixth NMOS transistor coupled to the negative supply voltage node through a seventh resistor. In some embodiments, using each of the first through fifth PMOS transistors and the first through sixth NMOS transistors includes generating a voltage level at the source terminal of the fifth PMOS transistor approximately equal to twice a voltage level at the output node. In some embodiments, the method includes using a fourth NMOS transistor to couple the input node to the negative supply voltage node by a gate of the fourth NMOS transistor coupled to the operating voltage node through a sixth resistor, a drain terminal of the fourth NMOS transistor coupled to the input node, and a source terminal of the fourth NMOS transistor coupled to the negative supply voltage node through a seventh resistor, and using a fifth NMOS transistor to couple the gate of the fourth NMOS transistor to the negative supply voltage node by a gate of the fifth NMOS transistor coupled to the source terminal of the fourth NMOS transistor, a drain terminal of the fifth NMOS transistor coupled to the gate of the fourth NMOS transistor, and a source terminal of the fifth NMOS transistor coupled to the negative supply voltage node. In some embodiments, the method includes receiving a current at the input node from an external current source.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A voltage reference comprising:

an operating voltage node;

an input node;

an output node;

a first PMOS transistor comprising a gate and a drain terminal, each coupled to the input node, and a source terminal coupled to the operating voltage node through a first resistor;

second through fourth PMOS transistors, each comprising a gate coupled to the input node and a source terminal coupled to the operating voltage node through a respective one of second through fourth resistors;

an n-type flipped gate transistor comprising a gate and a drain terminal, each coupled to a drain terminal of the second PMOS transistor, and a source terminal coupled to a negative supply voltage node;

a first NMOS transistor comprising a gate coupled to the gate of the n-type flipped gate transistor, a drain terminal coupled to a drain terminal of the third PMOS transistor, and a source terminal connected to the output node;

a second NMOS transistor comprising a gate coupled to a drain terminal of the fourth PMOS transistor, a drain terminal connected to the output node, and a source terminal coupled to the negative supply voltage node through a fifth resistor; and a third NMOS transistor comprising a drain terminal connected to the output node, and a gate and a source terminal, each coupled to the negative supply voltage node.

2. The voltage reference of claim 1, further comprising:

a fourth NMOS transistor comprising a gate and a drain terminal, each coupled to the gate of the second NMOS transistor, and a source terminal coupled to the negative supply voltage node through a sixth resistor.

3. The voltage reference of claim 1, further comprising:

a fourth NMOS transistor comprising a gate coupled to the operating voltage node through a sixth resistor, a drain terminal coupled to the input node, and a source terminal coupled to the negative supply voltage node through a seventh resistor; and a fifth NMOS transistor comprising a gate coupled to the source terminal of the fourth NMOS transistor, a drain terminal coupled to the gate of the fourth NMOS transistor, and a source terminal coupled to the negative supply voltage node.

4. The voltage reference of claim 1, wherein the input node is coupled to an external current source.

5. The voltage reference of claim 1, wherein a bulk of the n-type flipped gate transistor is coupled to the negative supply voltage node, and a bulk of the third NMOS transistor is coupled to the negative supply voltage node.

6. The voltage reference of claim 1, wherein a gate electrode of the gate of the n-type flipped gate transistor comprises:

a body region comprising p-type dopants; and edges comprising n-type dopants.

7. The voltage reference of claim 1, wherein each of the first through fifth resistors comprises a series of one or more unit resistors, and each unit resistor comprises a serpentine structure having a resistance of one megaohm or greater.

8. A voltage reference comprising:

an operating voltage node;

an input node;

an output node;

a first PMOS transistor comprising a gate and a drain terminal, each coupled to the input node, and a source terminal coupled to the operating voltage node through a first resistor;

second through fourth PMOS transistors, each comprising a gate coupled to the input node and a source terminal coupled to the operating voltage node through a respective one of second through fourth resistors;

an n-type flipped gate transistor comprising a gate and a drain terminal, each coupled to a drain terminal of the second PMOS transistor, and a source terminal coupled to a negative supply voltage node;

a first NMOS transistor comprising a gate coupled to the gate of the n-type flipped gate transistor, a drain terminal coupled to a drain terminal of the third PMOS transistor, and a source terminal connected to the output node;

a second NMOS transistor comprising a gate coupled to a drain terminal of the fourth PMOS transistor, a drain terminal connected to the output node, and a source terminal coupled to the negative supply voltage node through a fifth resistor;

a third NMOS transistor comprising a drain terminal connected to the output node, and a gate and a source terminal, each coupled to the negative supply voltage node;

a fifth PMOS transistor comprising a source terminal coupled to the drain terminals of the third PMOS transistor and first NMOS transistor, and a drain terminal coupled to the negative supply voltage node; and a fourth NMOS transistor comprising a gate coupled to the gates of the n-type flipped gate transistor and first NMOS transistor, a drain terminal coupled to the operating voltage node, and a source terminal coupled to a gate of the fifth PMOS transistor.

9. The voltage reference of claim 8, further comprising:

a fifth NMOS transistor comprising a gate and a drain terminal, each coupled to the gate of the second NMOS transistor, and a source terminal coupled to the negative supply voltage node through a sixth resistor; and a sixth NMOS transistor comprising a gate coupled to the gate of the second NMOS transistor, a drain terminal coupled to the gate of the fifth PMOS transistor, and a source terminal coupled to the negative supply voltage node through a seventh resistor.

10. The voltage reference of claim 9, wherein the first through fifth PMOS transistors, the first through sixth NMOS transistors, and the first through seventh resistors are configured to generate a voltage level at the source terminal of the fifth PMOS transistor approximately equal to twice a voltage level at the output node.

11. The voltage reference of claim 9, wherein each of the first through seventh resistors comprises a series of one or more unit resistors, and each unit resistor comprises a serpentine structure having a resistance of one megaohm or greater.

12. The voltage reference of claim 8, further comprising:

a fifth NMOS transistor comprising a gate coupled to the operating voltage node through a sixth resistor, a drain terminal coupled to the input node, and a source terminal coupled to the negative supply voltage node through a seventh resistor; and a sixth NMOS transistor comprising a gate coupled to the source terminal of the fifth NMOS transistor, a drain terminal coupled to the gate of the fifth NMOS transistor, and a source terminal coupled to the negative supply voltage node.

13. The voltage reference of claim 8, wherein the input node is coupled to an external current source.

14. The voltage reference of claim 8, wherein a bulk of the n-type flipped gate transistor is coupled to the negative supply voltage node, a bulk of the first NMOS transistor is coupled to the output node, and a bulk of the third NMOS transistor is coupled to the negative supply voltage node.

15. A method of operating a voltage reference, the method comprising:

receiving an operating voltage at an operating voltage node;

using a gate and a drain terminal of a first PMOS transistor to couple an input node to the operating voltage node through a source terminal of the first PMOS transistor and a first resistor;

using the input node to control second through fourth PMOS transistors, each comprising a gate coupled to the input node and a source terminal coupled to the operating voltage node through a respective one of second through fourth resistors;

using a gate and a drain terminal of an n-type flipped gate transistor to couple a drain terminal of the second PMOS transistor to a negative supply voltage node;

using a first NMOS transistor comprising a gate coupled to the gate of the n-type flipped gate transistor to couple a drain terminal of the third PMOS transistor to an output node through the drain terminal of the first NMOS transistor coupled to the drain terminal of the third PMOS transistor and a source terminal of the first NMOS transistor connected to the output node;

using a gate of a second NMOS transistor coupled to a drain terminal of the fourth PMOS transistor to couple the output node to the negative supply voltage node through a drain terminal of the second NMOS transistor connected to the output node and a source terminal coupled to the negative supply voltage node through a fifth resistor; and using a gate and a source terminal of a third NMOS transistor to couple the negative supply voltage node to the output node through a drain terminal of the third NMOS transistor connected to the output node.

16. The method of claim 15, further comprising:

using a fifth PMOS transistor to couple the drain terminals of the third PMOS transistor and first NMOS transistor to the negative supply voltage node through a source terminal of the fifth PMOS transistor coupled to the drain terminals of the third PMOS transistor and first NMOS transistor and a drain terminal of the fifth NMOS transistor coupled to the negative supply voltage node; and using a fourth NMOS transistor to control the fifth PMOS transistor by a gate of the fourth NMOS transistor coupled to the gates of the n-type flipped gate transistor and first NMOS transistor, a drain terminal of the fourth NMOS transistor coupled to the operating voltage node, and a source terminal of the fourth NMOS transistor coupled to a gate of the fifth PMOS transistor.

17. The method of claim 16, further comprising:

using a gate and a drain terminal of a fifth NMOS transistor to couple the gate of the second NMOS transistor to the negative supply voltage node through a source terminal of the fifth NMOS transistor and a sixth resistor; and using a sixth NMOS transistor to couple the gate of the fifth PMOS transistor to the negative supply voltage node by a gate of the sixth NMOS transistor coupled to the gate of the second NMOS transistor, a drain terminal of the sixth NMOS transistor coupled to the gate of the fifth PMOS transistor, and a source terminal of the sixth NMOS transistor coupled to the negative supply voltage node through a seventh resistor.

18. The method of claim 17, wherein the using each of the first through fifth PMOS transistors and the first through sixth NMOS transistors comprises generating a voltage level at the source terminal of the fifth PMOS transistor approximately equal to twice a voltage level at the output node.

19. The method of claim 15, further comprising:

using a fourth NMOS transistor to couple the input node to the negative supply voltage node by a gate of the fourth NMOS transistor coupled to the operating voltage node through a sixth resistor, a drain terminal of the fourth NMOS transistor coupled to the input node, and a source terminal of the fourth NMOS transistor coupled to the negative supply voltage node through a seventh resistor; and using a fifth NMOS transistor to couple the gate of the fourth NMOS transistor to the negative supply voltage node by a gate of the fifth NMOS transistor coupled to the source terminal of the fourth NMOS transistor, a drain terminal of the fifth NMOS transistor coupled to the gate of the fourth NMOS transistor, and a source terminal of the fifth NMOS transistor coupled to the negative supply voltage node.

20. The method of claim 15, further comprising:

receiving a current at the input node from an external current source.

* * * * *